United States Patent [19]

White et al.

[11] Patent Number: 5,452,125
[45] Date of Patent: Sep. 19, 1995

[54] CONFOCAL IMAGING SYSTEM FOR MICROSCOPY

[75] Inventors: John G. White; William B. Amos, both of Cambridge; James M. Fordham, Cambridgeshire, all of United Kingdom

[73] Assignee: Medical Research Council, London, England

[21] Appl. No.: 969,142

[22] PCT Filed: Jul. 26, 1991

[86] PCT No.: PCT/GB91/01268
§ 371 Date: Jan. 25, 1993
§ 102(e) Date: Jan. 25, 1993

[87] PCT Pub. No.: WO92/02838
PCT Pub. Date: Feb. 20, 1992

[30] Foreign Application Priority Data

Jul. 28, 1990 [GB] United Kingdom ............... 9016632

[51] Int. Cl.⁶ .................... G02B 21/00; G02B 26/08
[52] U.S. Cl. ...................... 359/368; 359/201; 359/385; 359/729; 359/731
[58] Field of Search .................... 359/201–202, 359/368–369, 385, 389, 729–731, 365–366, 857–859, 212, 213, 223, 225, 226, 390; 250/201.3

[56] References Cited

U.S. PATENT DOCUMENTS

| 3,951,546 | 4/1976 | Markle .................. 359/366 |
| 4,170,398 | 10/1979 | Koester .................. 351/7 |
| 5,035,476 | 7/1991 | Ellis et al. .............. 359/202 |
| 5,225,923 | 7/1993 | Montagu ................. 359/201 |

OTHER PUBLICATIONS

Burns et al, "Scanning slit aperture confocal/microscopy for three dimensional imaging", Scanning, vol.1 12, May–Jun. 1990, pp. 156–160.

Primary Examiner—Loha Ben
Assistant Examiner—James Phan
Attorney, Agent, or Firm—Lee, Mann, Smith, McWilliams, Sweeney & Ohlson

[57] ABSTRACT

A confocal imaging system for use in conjunction with an optical microscope, in which a slit-shaped or bar-shaped beam of light is scanned over the specimen, descanned with a fixed mask and rescanned for viewing or recording, the focussing and scanning system being constituted by wholly reflective optical systems.

7 Claims, 1 Drawing Sheet

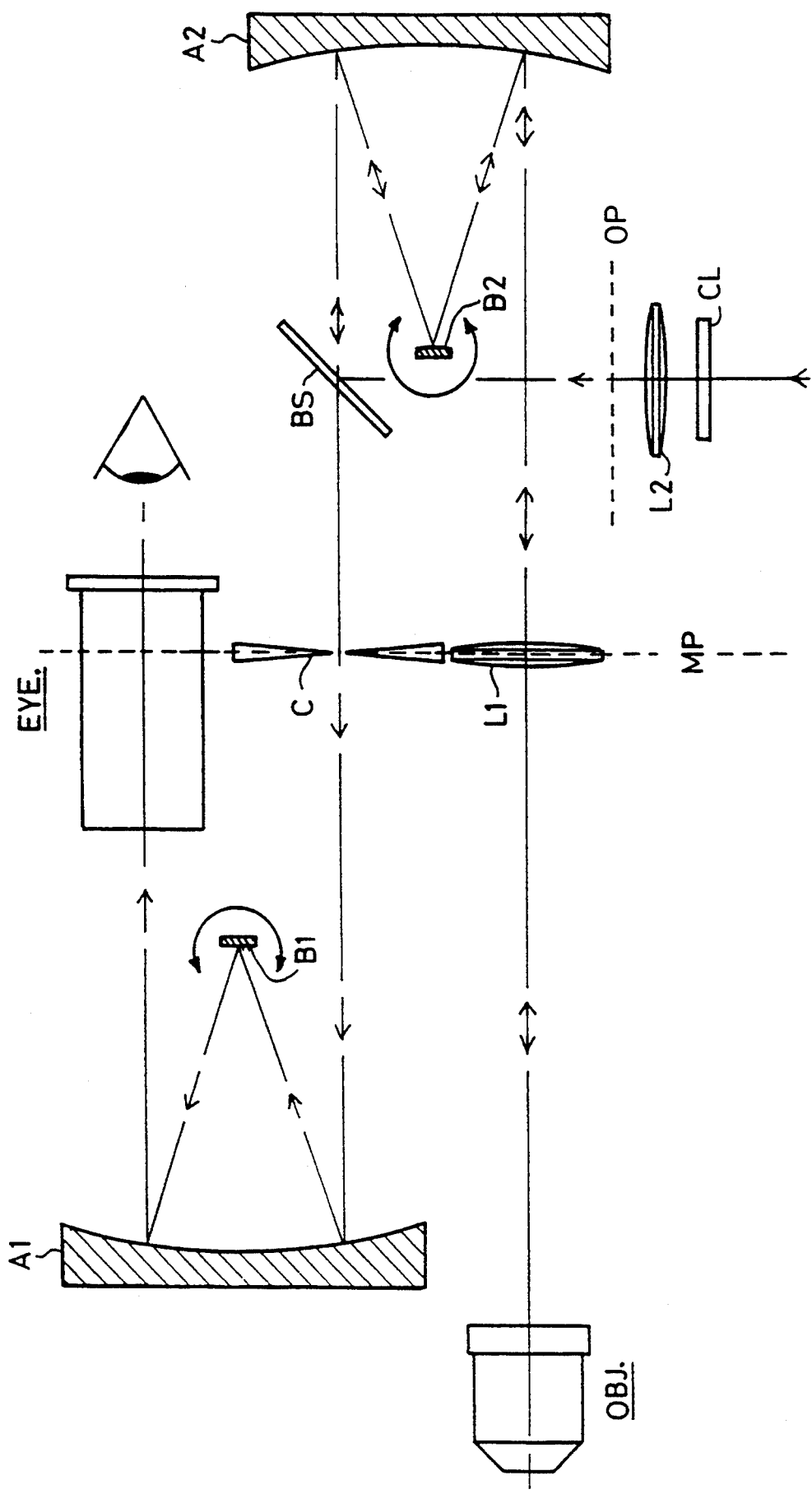

CONFOCAL IMAGING SYSTEM FOR MICROSCOPY

FIELD OF THE INVENTION

This invention relates to a confocal imaging system for microscopy and, in particular, to such a system which utilises slit scanning.

PRIOR ART

The principle of confocal imaging was first described by Minsky (see U.S. Pat. No. 3,013,467). Moving-slit, confocal imaging systems have been described by Baer (U.S. Pat. No. 3,547,512 and Lichtman (see Lichtman, J. W., Sunderland, W. J., and Wilkinson, R. S. (1989) in The New Biologist 1, 75–82. Also, forms of confocal microscope have been described in which a slit or bar pattern of light is scanned across the specimen and an image of this pattern formed by reflection or emission from the specimen is caused to fall on a stationary slit-shaped aperture. This use of a stationary slit is a feature of the systems described by Koester (Koester, C. J. (1980) Appl. Optics 19, 1749–1757., Burns et al. (Burns, D. H., Hatangadi. R. B. and Spelman, F. A. (1990) Scanning, 12, 156–160) and of the design of Brakenhoff and Visscher (Brakenhoff, G. J. & Visscher, K. (1990) Trans. Roy. microsc. Soc. 1, 247–250). A reflecting autocollimating system with no primary aberrations was described by Offner (see A. Offner, Optical Engineering (1975), 14, 131).

BACKGROUND TO THE INVENTION

Confocal imaging systems have become established as an effective means of eliminating out-of-focus interference in optical microscopy. In these systems only a very small area in the object plane is illuminated at any given time. The illumination in the object plane may be in the form of a single point, an array of points, a single line or an array of lines. A mask with the same geometrical form as the illuminating pattern is incorporated in a plane conjugate with the object plane, so that only signals from the immediate vicinity of the illuminated regions are admitted through the mask into the viewing system. In this way, interfering signals emanating away from the illuminated regions are rejected. A complete image is built up by scanning the illuminating pattern in such a way as to cover the whole of the area of the object plane, whilst keeping the mask in register with the illumination.

There are advantages in using a slit or array of slits rather than a single point as the pattern of illumination. For example, a complete image can be formed more rapidly and the instantaneous intensity of illumination required at any single point in the specimen can be reduced. An increase in the rate of formation of images (framing rate) is of particular value, since it can be used with direct visual observation to create the impression of continuous imaging. If a slit is used, it is desirable to be able to vary the width of the slit in the mask relative to that of the illuminated slit-shaped area. In some prior art, such as that of Lichtman, this is impossible, since one and the same mask serves to define both the illumination and the area of detection. The closest prior art, in this respect, is that of Koester, of Burns et al. and of Brakenhoff and Visscher, where the system is so constructed that the detection mask is stationary, so that the mask is easy to adjust in a continuous fashion during the operation of the microscope system. Koester's system fails to employ the full aperture of the objective lens of the microscope and is therefore compromised in image quality. The system of Baer depends on chromatic dispersion for its operation and is therefore not suitable for the main field of application of confocal microscopes, which is the examination of fluorescence in specimens.

The closest prior art (ie that of Burns et al. and Visscher and Brakenhoff) requires lenses to relay the image within the apparatus. This presents considerable problems since the chromatic performance of lenses is poor outside the restricted range of wavelengths for which they are designed. Also, in order to make the instrument conveniently small, the relay lenses must have high numerical apertures, which makes them difficult to design and expensive to manufacture.

THE INVENTION

According to the present invention, there is provided, in combination with a microscope, a confocal imaging system comprising means for forming a slit-shaped or bar-shaped illuminating beam, or an array of such beams, a beam-splitting means by which the light is directed into an optical microscope having an objective lens, and an optical scanning means means whereby the illuminating beam or beams is or are caused to scan and be directed into the objection lens of the microscope in order to scan the specimen, such optical scanning means consisting of a wholly reflective optical system for both focussing and scanning.

Preferably, the same reflective optical system causes the emitted or reflected beam to be descanned (ie brought to a stationary state) and focussed upon a stationary confocal mask such as a slit of variable width, or an array of such slits.

The stationary slit image delimited by the mask can then be rescanned by a second wholly reflective optical system and brought to focus within an eyepiece or upon the photosensitive surface of a video camera as a two-dimensional image.

In a preferred embodiment the first-mentioned reflective system, and likewise the second reflective system, consists of a modified Offher autocollimation system, in which the inner element of the Offner system is caused to oscillate. This modification converts the known Offner relay into a unique reflective scanning system.

The use of reflective elements for focussing at appropriate points in the system is also an improvement over prior art, in that such elements are inexpensive to manufacture and perform well over a very wide range of wavelengths.

DESCRIPTION OF EMBODIMENT

The confocal imaging system according to the invention is exemplified in the following description, making reference to the single FIGURE of drawings, in which a preferred system is shown schematically.

The system is interposed between the objective (OBJ) and the eyepiece (EYE) of a conventional microscope. It includes two Offnet reflecting autocollimation units (A1,B1 and A2,B2).

An Offher autocollimation system consists of a pair of mirrors with radii of curvature in the ratio 1:2. The mirror of smaller radius is convex, the other concave. As described by Offner, this system functions as a 1:1 optical relay if light is reflected through it in the manner shown in the drawing. Thus, the Offner system consisting of mirrors A1 and B1 focusses the slit C at the plane shown as a dotted line in the eyepiece (EYE). The other Offnet system, consisting of mirrors A2 and B2, creates conjugate loci in the plane OP and on the median plane MP at the slit C and within the lens L1. The value of the Offner system in the present context is its ease of fabrication, total achromatism and freedom from primary aberrations.

Illumination is injected via a beam splitter (BS). The light could be provided by an illuminated slit. However, in the preferred embodiment a slit is not used. Instead a parallel laser beam is passed through a cylindrical lens (CL) and then through a conventional spherical lens (L2) to provide a focussed line of laser light in the plane 0P which is conjugate with the object plane. The illuminating beam is directed through the Offner unit proximate to the microscope (B2, A2).

In accordance with the invention, the Offner units are modified in that the convex mirrors B1 and B2 are each caused to oscillate about an axis perpendicular to the plane of the diagram, whereby the beam is caused to scan.

Both of the convex mirrors shown in FIG. 1 lie in the aperture planes in relation to the microscope rather than in image planes and they are therefore ideally placed to serve as scaning elements.

The light passes from B2 in a scanning state and enters the objective lens (OBJ) via a coupling lens L1, which functions to bring the back aperture of the objective into a plane conjugate with that of B2.

The signal from the object being illuminated then traverses this path in reverse and is scanned by the mirror B2. It then passes through the beam splitter BS to the masking slit C where it is brought into focus and traverses the slit. Interfering signals emanating from regions away from the illuminated line are rejected by the slit. The slit is adjustable in width to allow stringent confocal conditions to be imposed (slit narrow) or a brighter image of a less confocal nature to be formed (slit wide). The oscillating mirror B1 in the second Offner unit acts to descan the signal, recreating a stationary two-dimensional image at the mid-plane (MP) which can be viewed directly with the eyepiece or be recorded in a camera.

The movement of the convex mirrors B1 and B2 may take any form that scans the whole field, but sweeps of uniform angular velocity in alternate directions are preferable as this reduces dead time and gives an image of uniform brightness. In the preferred embodiment the mirror B2 works in synchronism but antiphase to the oscillating mirror B1.

The beam splitter BS could be either a simple device producing any desired ratio of reflected and transmitted intensities, or alternatively a dichromatic reflector (dichroic) as is conventional in fluorescence microscopy.

We claim:

1. In combination with an optical microscope, a confocal imaging system which comprises means for forming a slit-shaped illuminating beam, a beam splitting means by which the slit-shaped illuminating beam is directed into an optical microscope having an objective lens and an eyepiece, a modified Offner collimating system having an inner mirror in which the inner mirror is caused to rotate for directing a scanning beam onto the objective lens, the modified Offner collimating system acting to form a focused image at a second optical relay system which acts to descan said image for forming a focused stationary image at the eyepiece.

2. The combination claimed in claim 1, wherein the second optical relay system is a wholly reflective system.

3. The combination claimed in claim 2, wherein the second optical relay system is a second modified Offner collimating system having an inner mirror in which the inner mirror is rotated to descan said focused image.

4. The combination claimed in claim 3, in which the respective inner mirrors of the first and second modified Offner collimating systems oscillate in synchronism but in anti-phase.

5. The combination claimed in claim 4, in which the respective inner mirrors oscillate with uniform angular velocity in alternate rotational senses.

6. The combination claimed in 1, in which the modified Offner collimating system causes a beam returned from the specimen to be scanned and focused through the beam splitter on a stationary confocal mask.

7. The combination claimed in claim 6, wherein said mask is a slit of variable width.

* * * * *